United States Patent
Malipatil et al.

(10) Patent No.: US 8,837,626 B2
(45) Date of Patent: Sep. 16, 2014

(54) CONDITIONAL ADAPTATION OF LINEAR FILTERS IN A SYSTEM HAVING NONLINEARITY

(75) Inventors: Amaresh Malipatil, San Jose, CA (US); Pervez M. Aziz, Dallas, TX (US); Mohammad S. Mobin, Orefield, PA (US); Ye Liu, San Jose, CA (US)

(73) Assignee: LSI Corporation, Milpitas, CA (US)

(*) Notice: Subject to any disclaimer, the term of this patent is extended or adjusted under 35 U.S.C. 154(b) by 394 days.

(21) Appl. No.: 13/315,831

(22) Filed: Dec. 9, 2011

(65) Prior Publication Data

US 2013/0148712 A1    Jun. 13, 2013

(51) Int. Cl.
    H04L 27/01    (2006.01)
(52) U.S. Cl.
    USPC .......................... 375/285; 375/233; 375/259
(58) Field of Classification Search
    CPC .................................................. H04L 25/0307
    USPC ........................................ 375/285, 233, 259
    See application file for complete search history.

(56) References Cited

U.S. PATENT DOCUMENTS

| | | | |
|---|---|---|---|
| 5,524,124 A | 6/1996 | Koenig | |
| 7,016,406 B1 | 3/2006 | Phanse et al. | |
| 7,440,497 B2 | 10/2008 | Balan et al. | |
| 7,526,022 B2 | 4/2009 | Nieto | |
| 7,599,461 B2 | 10/2009 | Aziz et al. | |
| 7,606,301 B2 | 10/2009 | Aziz et al. | |
| 7,616,686 B2 | 11/2009 | Aziz et al. | |
| 7,636,408 B2 | 12/2009 | Bau et al. | |
| 7,696,800 B2 | 4/2010 | Azimi et al. | |
| 2002/0003835 A1* | 1/2002 | Wu ............................... | 375/219 |
| 2003/0026332 A1* | 2/2003 | Taunton ........................ | 375/222 |
| 2007/0195874 A1* | 8/2007 | Aziz et al. ..................... | 375/233 |
| 2008/0068141 A1* | 3/2008 | Yokomitsu et al. ......... | 340/310.11 |
| 2010/0046598 A1 | 2/2010 | Zhong et al. | |
| 2013/0077669 A1* | 3/2013 | Malipatil et al. .............. | 375/233 |

OTHER PUBLICATIONS

Kasturia, Sanjay and Winters, Jack H.; Techniques for High-Speed Implementation of Nonlinear Cancellation; IEEE Journal on Selected Areas in Communications; Jun. 1991; vol. 9, No. 5; pp. 711-717.

Kerpen, G.S.M.; Data-Aided Equalization Using Receivers with a Restricted Decoding-Delay; Eindhoven University of Technology; Department of Electrical Engineering; Graduate Report; Oct. 1987.

* cited by examiner

Primary Examiner — Michael Neff

(57) ABSTRACT

Described embodiments adjust configurable parameters of at least one filter of a communication system. The method includes conditioning, by an analog front end (AFE) of a receiver in the communication system, an input signal applied to the receiver. Sampled values of the conditioned input signal are generated and digitized. An error detection module generates an error signal based on digitized values of the input signal and a target value. A decision feedback equalizer generates an adjustment signal based on the digitized values of the input signal and values of the error signal. A summer subtracts the adjustment signal from the conditioned input signal, generating an adjusted input signal. An adaptation module determines a conditional adaptation signal based on a comparison of sampled values of the adjusted input signal and values of the error signal. The adaptation module adjusts a transfer function of at least one filter based on the conditional adaptation signal.

27 Claims, 8 Drawing Sheets

CONDITIONAL ADAPTATION OF LINEAR FILTERS IN A SYSTEM HAVING NONLINEARITY

CROSS-REFERENCE TO RELATED APPLICATIONS

This application is related to U.S. patent application Ser. No. 13/244,985 filed on Sep. 26, 2011, the teachings of which are incorporated herein in their entireties by reference.

BACKGROUND

Digital communication receivers typically sample an analog waveform and detect the sampled data. Signals arriving at a receiver might be corrupted by intersymbol interference (ISI), crosstalk, echo, and other noise. Thus, receivers typically equalize the channel, to compensate for such distortions, and decode the encoded signals at increasingly high clock rates. Many receivers apply equalization to the analog received signal using an analog front-end equalizer (AFE) that acts as a filter having parameters initially based on an estimate of the channel's features. An AFE is generally employed during the signal acquisition process, since little information about the channel transfer function is available during acquisition. Once the signal is received, the analog filter parameters might be adapted based on information derived from the received analog signal. Decision-feedback equalization (DFE) is a widely-used technique for removing intersymbol interference and other noise, and is often employed in conjunction with an AFE after acquisition. Generally, decision-feedback equalization utilizes a nonlinear equalizer to equalize the channel using a feedback loop based on previously decided symbols.

In many data communication applications, Serializer and De-serializer (SERDES) devices facilitate the transmission between two points of parallel data across a serial link. Data at one point is converted from parallel data to serial data and transmitted through a communications channel to the second point where it received and converted from serial data to parallel data.

At high data rates, frequency-dependent signal loss from the communications channel (e.g., the signal path between the two end points of a serial link) as well as signal dispersion and distortion can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response. Equalization might be through a front end equalizer, a feedback equalizer, or some combination of both.

FIG. 1 shows a data eye diagram 100 overlaid with exemplary data sampler (DS) 102. Data eye diagram 100 illustrates super-positions of many data eyes of signal transitions expressed in amplitude versus time (in unit interval, or "UI", corresponding to a symbol period). The data eye is created as signals transition from low to low, low to high, high to low and high to high, which transition might also be termed a crossing point. A clock and data recovery (CDR) circuit detects timing of the input data stream and uses such detected timing to set correct frequency and phase of a local clock from which the sampling clock for DS 102 is derived. As employed herein, "placing" a sampler (latch) in a data stream requires setting a voltage threshold and clocking phase of the sampler to detect a predetermined point in the data eye. Clocking the data sampler with a clock signal with known frequency and phase derived with respect to the detected symbol timing of data allows for clock recovery of symbols within the data stream generating the eye.

CDR circuits form a critical part of the receiver in a SERDES device. The objective of the CDR circuit is to track the phase of a sampling clock based on some criterion, such as minimized mean-squared-error (MMSE). To track the phase of a sampling clock based on a given criterion, the CDR circuit generates (timing) error samples with respect to the data sampling clock, and adaptively sets the local clock phase and/or frequency used to derive the data sampling clock so as to minimize the timing error with respect to the chosen criterion. The CDR circuit desirably operates so as to achieve very low target bit-error-ratio (BER) (usually, on the order of 1e-12 or 1e-15). The CDR circuits commonly employed might be broadly classified into two categories: baud-rate CDR circuits and bang-bang CDR circuits, with each class having associated advantages and disadvantages.

In bang-bang or Alexander type CDR circuits, the received signal is sampled twice every symbol period, which is the "unit interval" (UI) above. Ideally, one sample is at the crossing boundary and another at the center of the eye. Two consecutive data samples, (d[k−1] and d[k]), and one crossing sample between them, (p[k]), are used to decide whether the current sampling phase is lagging or leading the ideal sampling point and, if either lagging or leading, is corrected accordingly. In a bang-bang CDR circuit, the eye looks symmetric about the sampling point, which is generally desirable for enhanced sinusoidal jitter tolerance. However, oversampling the received signal adds cost and complexity to, for example, a given implementation of a SERDES receiver.

In a baud-rate CDR circuit, the received signal is sampled at the baud rate, i.e., once every UI, so oversampling is not required. The sampling phase might be selected based on different criteria. For example, in a MMSE baud-rate CDR, the sampling phase that yields MMSE is chosen. The phase detector equation implemented in a baud-rate CDR relies on the error samples and the decisions. For example, in a Mueller-Muller CDR, the phase update equation to update phase $\tau_k$ to phase $\tau_{k+1}$ is given in equation (1):

$$\tau_{k-1} = \tau_k - \mu(e_{k-1}d_k - e_k d_{k-1}) \qquad (1)$$

where $d_k$ and $e_k$ are the decisions and the error samples, respectively, where $e_k = (y(\tau_k) - \gamma d_k)$, y(t) is the input signal (usually the output of an equalizer) to a slicer (employed to generate a decision for the input sample) and $\gamma$ is the reference voltage, which might also be adapted. The error samples are obtained at the same phase, $\tau_k$, where the data is sampled. Consequently, the error samples are employed as timing error samples by a timing adaptation loop, and the error samples are employed as data error samples by an equalizer adaptation loop if the receiver includes adaptive equalization.

Therefore, if the receiver incorporates a DFE, the error samples also drive the adaptation of the DFE taps. Returning, to FIG. 1, the data latch DS 102, is shown with positive (top eye edge) and negative (bottom eye edge) error latches 104 and 105 placed above and below at sampling phase instant $\tau_k$. In a Mueller-Muller baud-rate CDR (MM-CDR) circuit, the sampling phase is chosen such that the 1st pre-cursor and the 1st post-cursor values of the equalized pulse about the sampling point are approximately equal. Thus, the sampling point chosen may not be the center of the equalized eye if the equalized pulse is not symmetrical in terms of 1st pre-cursor and 1st post-cursor values.

Ideally, without noise, jitter, and other loss and dispersion effects, the data eye will exhibit a relatively ideal shape with large amplitude and phase margin, illustrated by area 110. In practice, as described previously, the shape of the data eye changes, illustrated by the traces in FIG. 1, providing a reduced area 111. The shape of the data eye changes with noise, jitter, other loss and dispersion effects, and temperature and voltage variations. The shape of the data eye also changes due to equalization applied to input signal of the receiver. In some systems, equalization is also applied by a transmitter's equalizer, further altering the shape of the eye from the ideal. After equalization, the inner eye of the transceiver is open, with some margin for supporting channels. If an AFE is employed, the data eye operating margin improves. However, better performance might be achieved through use of a DFE in combination with an AFE. Classical DFE equalization optimizes for ISI and opens up the vertical and horizontal data eye opening.

Often, the DFE used in conjunction with an AFE might utilize a non-linear equalizer to equalize the channel using a feedback loop based on previously detected (or decided) data. The AFE is typically used to control the input signal level and equalize for linear, frequency-based distortions in the input signal to the receiver. However, the analog circuitry in the AFE has inherent limitations, for example a maximum signal amplitude the AFE can handle before significant non-linear distortion occurs. Generally, should one or more amplifiers in the AFE begin to saturate, i.e., limit, signals into or out of the amplifiers, non-linear distortion of the input signal results. Presence of the non-linear distortion in the input signal might cause sub-optimal adaptation by the DFE to the input signal, resulting in possible poor performance by the receiver, such as a high bit error rate (BER). In general, there is an inverse relationship between the linear range of operation of the AFE and the power consumed by the AFE. Since typical SERDES receivers are designed for low power consumption, it is desirable to compensate for the presence of nonlinear compression of the input signal by the AFE, thus allowing improved performance of the receiver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments adjust configurable parameters of at least one filter of a communication system. The method includes conditioning, by an analog front end (AFE) of a receiver in the communication system, an input signal applied to the receiver. Sampled values of the conditioned input signal are generated and digitized. An error detection module generates an error signal based on digitized values of the input signal and a target value. A decision feedback equalizer generates an adjustment signal based on the digitized values of the input signal and values of the error signal. A summer subtracts the adjustment signal from the conditioned input signal, generating an adjusted input signal. An adaptation module determines a conditional adaptation signal based on a comparison of sampled values of the adjusted input signal and values of the error signal. The adaptation module adjusts a transfer function of a filter, such as the AFE, based on the conditional adaptation signal.

BRIEF DESCRIPTION OF THE DRAWING FIGURES

Other aspects, features, and advantages of embodiments of the present invention will become more fully apparent from the following detailed description, the appended claims, and the accompanying drawings in which like reference numerals identify similar or identical elements.

DESCRIPTION

Described embodiments of the invention provide conditional adaptation of one or more linear filters of a communications system. The conditional adaptation is based on at least one of: (1) the data relationship between a current data decision of the DFE and a current error signal, (2) a data relationship between the current data decision of the DFE and past data decisions of the DFE, and (3) a data relationship between the current data decision of the DFE and "future" data decisions of the DFE.

Table 1 summarizes a list of acronyms employed throughout this specification as an aid to understanding the described embodiments of the invention:

TABLE 1

| SERDES | Serializer/Deserializer | IC | Integrated Circuit |
|---|---|---|---|
| TXFIR | Transmit Finite Impulse Response | AEQ | Analog Equalizer |
| CDR | Clock and Data Recovery | DFE | Decision Feedback Equalizer |
| BER | Bit Error Rate | DAC | Digital to Analog Converter |
| ADC | Analog to Digital Converter | ISI | Intersymbol Interference |
| FFE | Feed Forward Equalizer | AFE | Analog Front End |

TABLE 1-continued

| VGA | Variable Gain Amplifier | MMSE | Minimized Mean Squared-Error |
| CTLE | Continuous time linear equalizer | LMS | Least Mean Square |

Although described herein as being employed in a serializer-deserializer (SERDES) communication system, embodiments of the present invention are not so limited, and some embodiments might be employed in alternative communications systems employing a transmitter and a receiver communicating over a communication channel. The communication channel might be at least one of fiber optics, one or more coaxial cables, one or more twisted pair copper wires, or one or more RF channels. Additionally, various signal modulation and de-modulation techniques might be employed.

Figure 1:
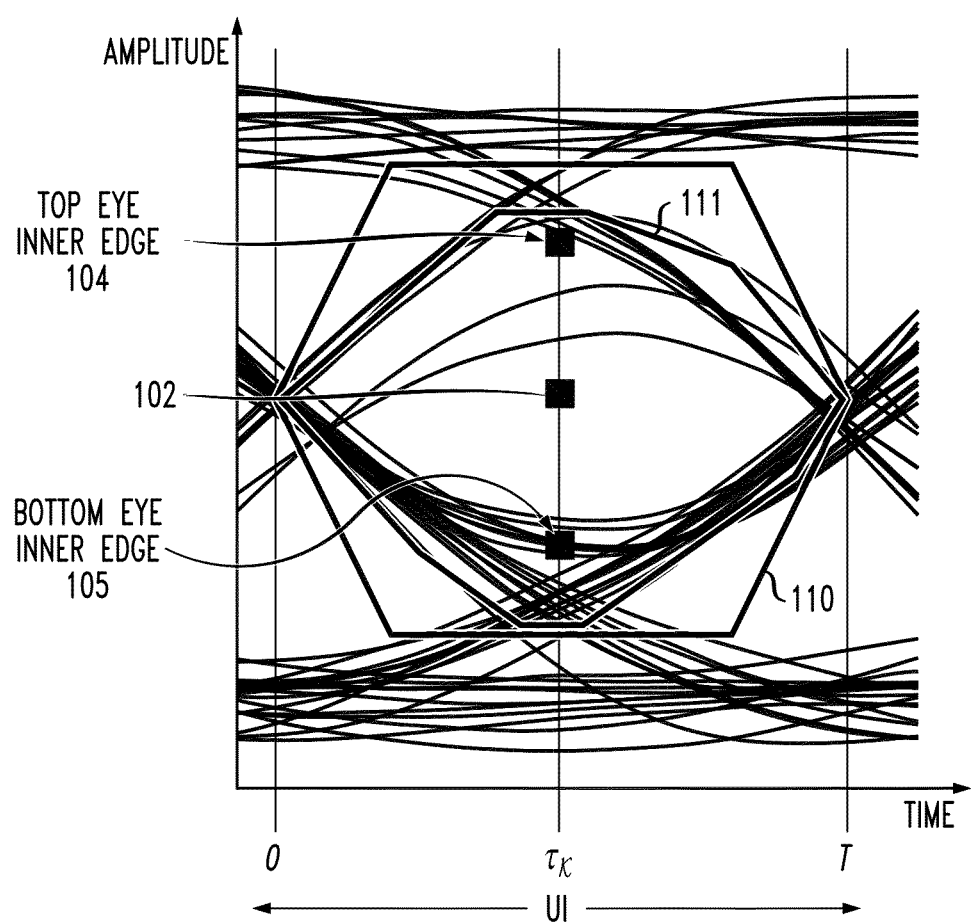
FIG. 1 shows an exemplary data eye diagram of prior art systems.
Figure 2:
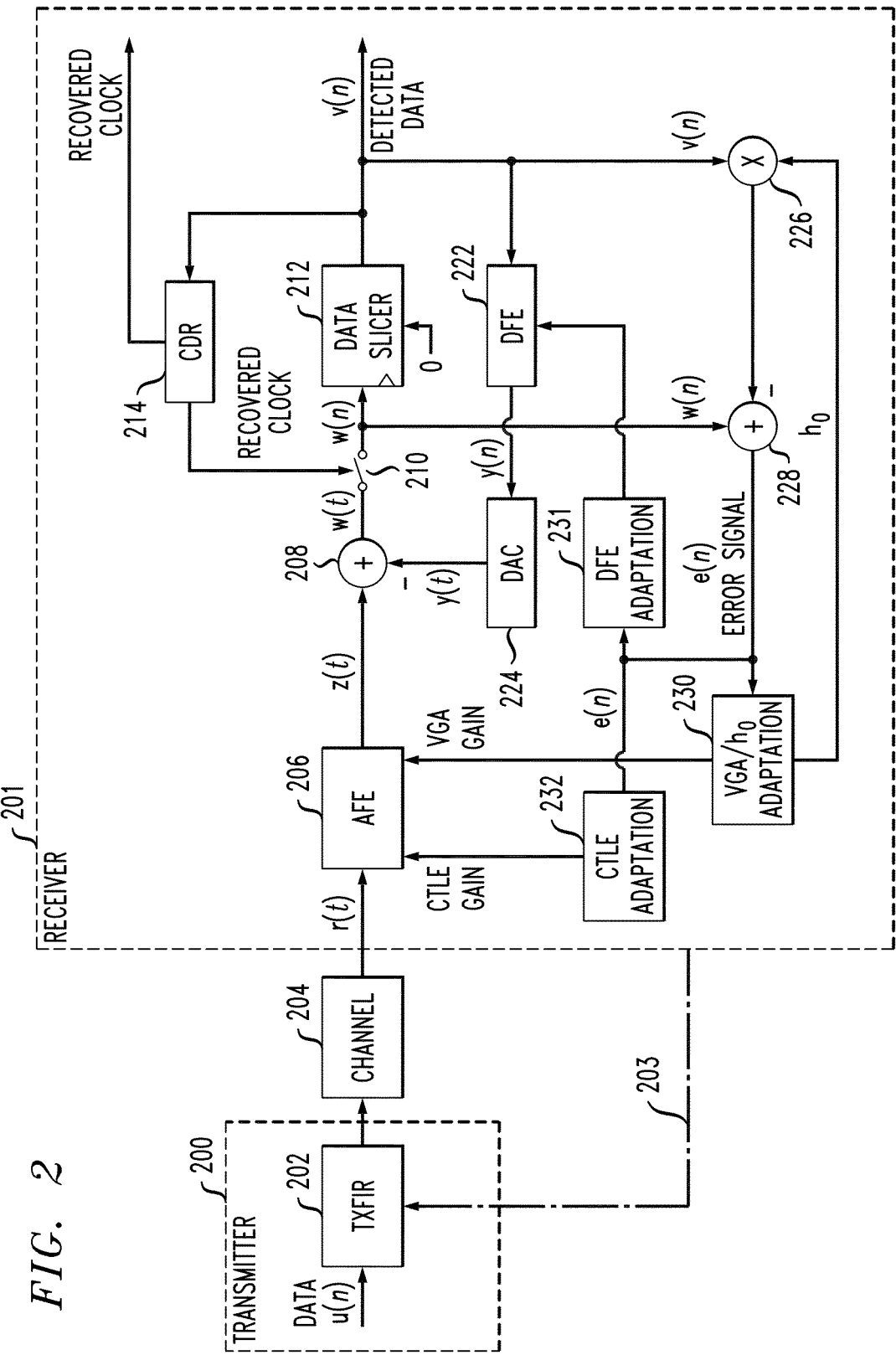
FIG. 2 shows an exemplary block diagram of a serializer-deserializer (SERDES) communication channel incorporating decision-feedback equalization and an analog front end (AFE)

FIG. 2 shows a block diagram of a SERDES communication system employing a transmitting device 200, a communication channel 204, and a receiving device 201. Communication channel 204 might typically be a physical transmission medium, such as a backplane, drive head in a magnetic recording system, copper cables, or optical fibers. In the exemplary implementation shown in FIG. 2, data is transmitted through communication channel 204 after optionally being equalized or filtered through transmit finite impulse response equalizer (TXFIR) 202. In some embodiments, the function of TXFIR 202 might optionally be moved from transmitter 200 to receiver 201. As shown, CDR 214 might be in communication with one or more of AFE 206 and TXFIR 202. Communication with TXFIR 202 might be via a backchannel 203.

After passing though communication channel 204, the analog transmit signal might be filtered or equalized by analog front end (AFE) 206 of receiver 201. AFE 206 might comprise a continuous time analog filter. The analog signal output of AFE 206, z(t), is given by equation (2):

$$z(t)=r(t)\star h_A(t) \quad (2)$$

where ★ denotes a continuous time convolution operation, r(t) is the signal received by receiver 201, and $h_A(t)$ is impulse response of AFE 206. The post-DFE equalized signal at slicer input is w(t). Decision feedback equalization (DFE) filter 222 generates a DFE correction signal, y(n), based on the data detected by data slicer 212, v(n). DFE correction signal y(n) is converted to a continuous time analog signal by digital-to-analog (DAC) converter 224. The analog correction signal, y(t), is subtracted by analog summer 208 from the output, z(t), of AFE 206 to produce DFE corrected signal w(t), where w(t) is given by equation (3):

$$w(t)=z(t)-y(t) \quad (3)$$

DFE corrected signal w(t) is sampled to produce sampled signal w(n), with w(n) given by equation (4):

$$w(n)=w(nT) \quad (4)$$

where T is the baud period and n is the sample number. The sampling operation is shown by virtue of switch 210. Many possible implementations for the sampling operation are known, for example by clocking data slicer 212 with a recovered clock generated by a clock and data recovery (CDR) circuit 214 to sample the corrected signal. CDR 214 is often an adaptive feedback circuit and the feedback loop adjusts the phase and frequency of the nominal clock to produce the recovered clock signal that samples the analog waveform to allow proper data detection since the phase of the analog waveform is typically unknown and there may be a frequency offset between the frequency at which the original data was transmitted and the nominal receiver sampling clock frequency. CDR 214 might include several components, such as a phase detector, a loop filter, and a clock generation circuit (not shown). CDR 214 might typically be one of two types: a baud rate CDR and an oversampled CDR (such as a bang-bang CDR). Sampled signal w(n) is sliced by data slicer 212 to produce detected data v(n).

Data slicer 212 digitizes the sampled data and compares the digitized samples to an exemplary threshold of zero, using the CDR recovered clock. Data slicer 212 might typically be implemented as a decision device based on an amplitude threshold, but might also be a more complicated detector such as a sequence detector. Data slicer 212 produces a binary version of r(n) or a quantized version with a multi-bit value using an analog to digital converter (ADC) (not shown) and a sequence detector (not shown). For high speed applications, data slicer 212 might be clocked by the CDR recovered clock.

The output of data slicer 212, detected data v(n), is used by DFE 222 to produce the DFE output y(n). Thus, DFE 222 employs past corrected detected data to produce the filtered DFE output y(n), which is given by equation (5):

$$y(n) = \sum_{l=1}^{L} b(l)v(n-l) \quad (5)$$

where b(l) represents the DFE coefficients or weights of L-tap DFE filter 222 and v(n−l) represents past data decisions by data slicer 212. The value of the tap weights b(l) might be determined by analyzing an error signal, e(n). One or more adaptation controllers, for example CTLE adaptation module 232 and VGA/$h_0$ adaptation module 230, are coupled to AFE 206 to adjust settings of AFE 206. DFE adaptation module 231 is coupled to DFE 222 vary the tap weights b(l) using an algorithm, such as least-mean-squared (LMS), to minimize error signal e(n).

Error signal e(n) is generated by subtractor 228 taking the difference between the DFE-corrected signal w(n) and a weighted version of the detected data generated by multiplier 226 multiplying together the detected data v(n) and a weight factor $h_0$. The error signal, e(n), is given by equation (6):

$$e(n)=w(n)-h_0*v(n) \quad (6)$$

Weight factor $h_0$ is generated by VGA/$h_0$ adaptation module 230 and might typically correspond to the mean amplitude of signal w(n) applied to the input of data slicer 212. VGA/$h_0$ adaptation module 230 also generates a VGA gain control signal for setting the gain of variable gain amplifier (VGA) 304 (FIG. 3) of AFE 206. CTLE adaptation module 232 generates a control signal for adjusting the one or more coefficient values of CTLE 302 (FIG. 3) of AFE 206. During the training or adaptation phase, CTLE adaptation module 232, responsive to error signal e(n), converges one or more coefficient values of CTLE 302 either to reduce intersymbol interference (ISI) during eye openings, to reduce signal transition jitter, or some other adaptation criteria. Thus, adaptation modules 230 and 232 are employed to adaptively adjust filter parameters of various gain, DFE and AEQ elements based on various samples and a minimized bit error rate (BER) criterion.

Figure 3:
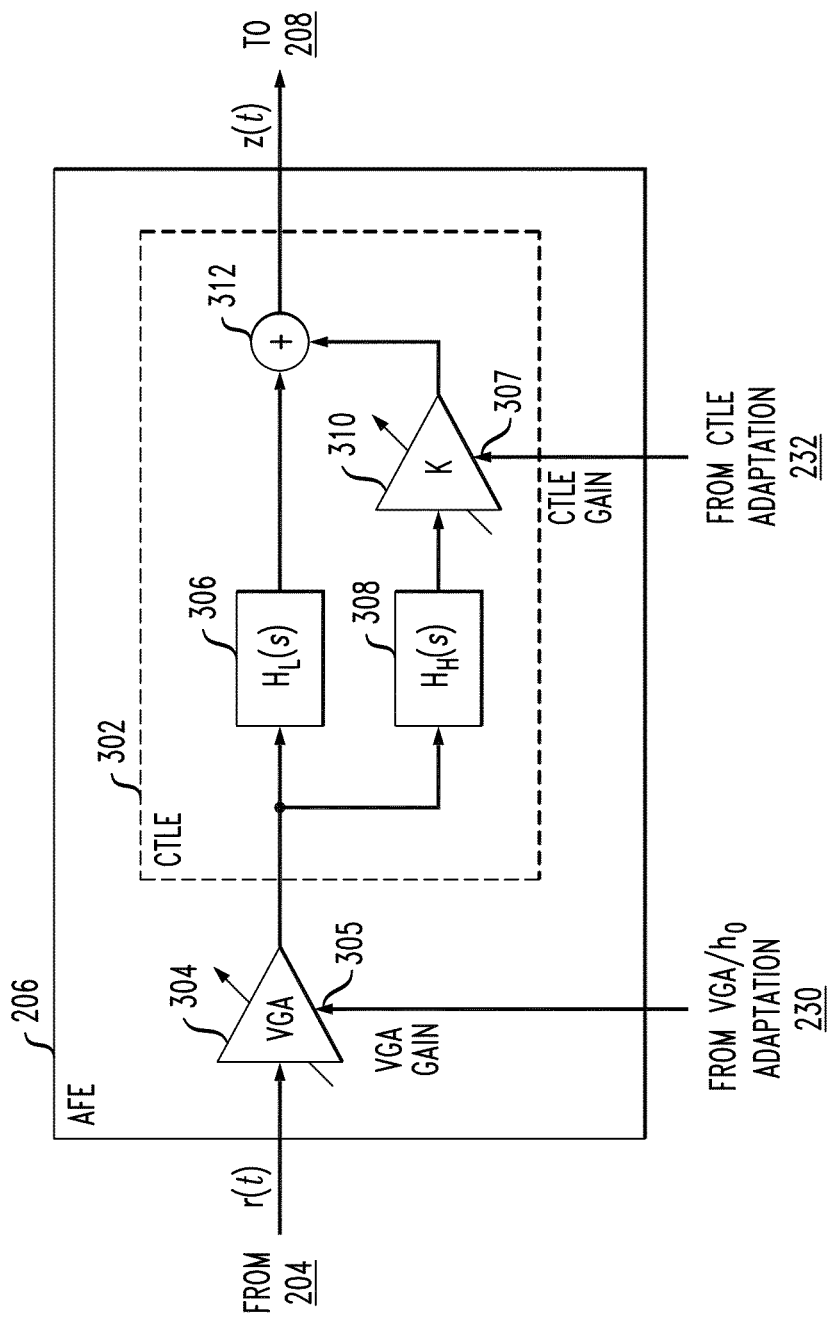
FIG. 3 shows an exemplary block diagram of the AFE of FIG. 2.

FIG. 3 shows an exemplary block diagram of AFE 206. As shown in FIG. 3, variable gain amplifier (VGA) 304 receives input signals from channel 204 of FIG. 2. VGA 304 has an adjustable gain input 305 from adaptation module 230 that might be either analog or digital in nature. The output of VGA 304 drives continuous-time linear equalizer (CTLE) 302. As shown, CTLE 302 has an input 307 from adaptation module 232 that allows for adjustment of one or more coefficients in CTLE 302 by changing the gain of high pass/band pass filter stage 310. A change in the one or more coefficients of CTLE 302 modifies the frequency-dependent characteristics of the output signals of one or more transmission paths of CTLE 302, shown as transmission paths 306 and 308. As indicated in FIG. 3, each transmission path 306 and 308 might have a transfer function, shown as $H_L(s)$ and $H_H(s)$, respectively, where $H_L(s)$ is a low frequency transfer function and $H_H(s)$ is a high frequency transfer function, and wherein a low frequency component and a high frequency component of the received signal might be independently adapted. By asserting the appropriate coefficient values on inputs 305 and 307, CTLE 302 might be adjusted to at least partially compensate for dispersion and other frequency-dependent distortions present in the input signal r(t) due to channel 204.

As described herein, VGA 304 and CTLE 302 are employed to amplify and/or equalize the signal input to receiver 201. VGA 304 and CTLE 302 have finite adjustment with respect to a maximum signal amplitude VGA 304 and CTLE 302 can provide at their respective outputs. Beyond certain amplitudes, the signal might saturate, resulting in compression of the outer envelope of the output signal. This nonlinear behavior is commonly characterized by a 1 dB compression point, wherein the signal is compressed by 1 dB with respect to linear output.

Figure 4:
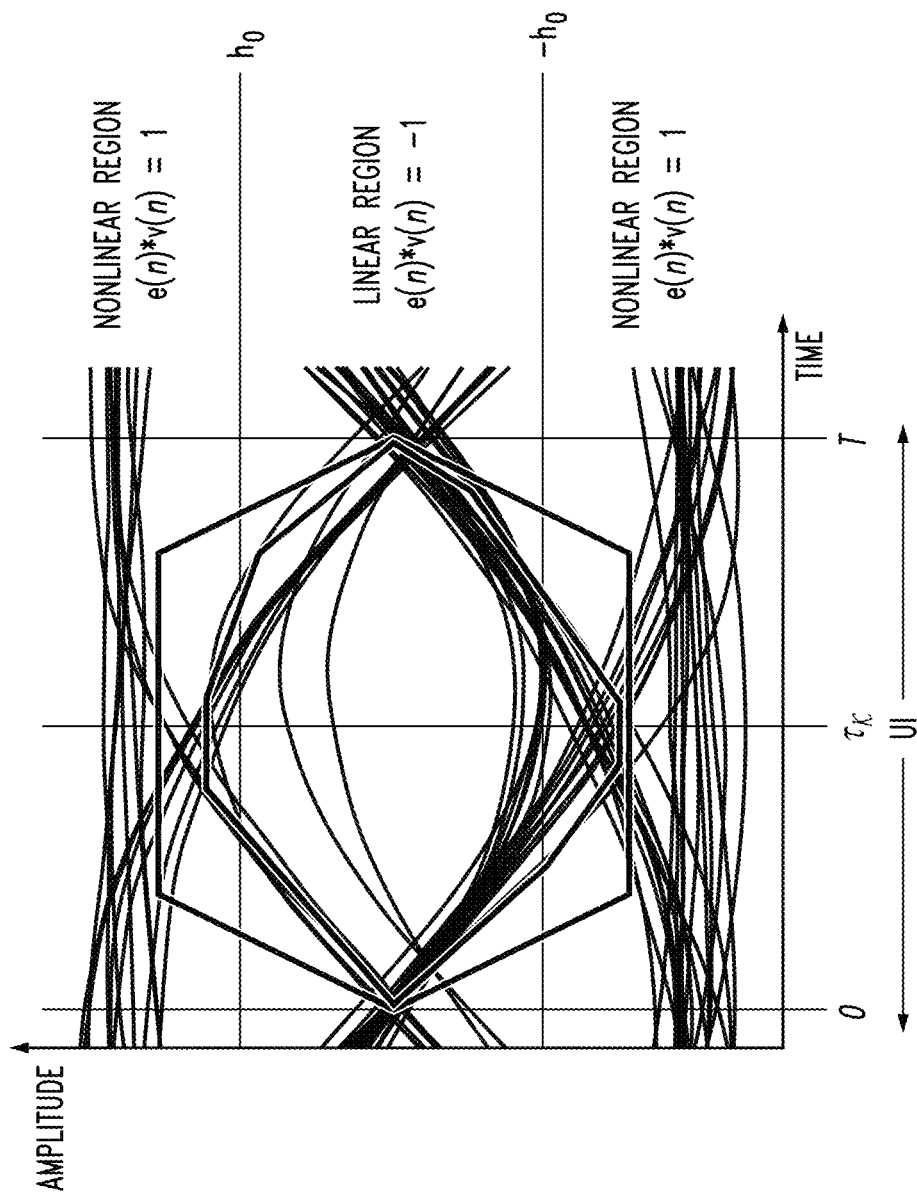
FIG. 4 shows an exemplary eye diagram of the AFE of FIG. 2.

Since nonlinear compression is more prevalent on signals having higher amplitudes, operation of VGA 304 and CTLE 302 might generally be described as having two regions: a linear region where $|w(n)| \leq h_0$ or $e(n)*v(n)=-1$, and a nonlinear region where $|w(n)| \geq h_0$ or $e(n)*v(n)=1$. An exemplary diagram showing the linear and nonlinear regions of operation of AFE 206 is shown in FIG. 4. In the linear region of operation of AFE 206, the error signal e(n) is employed to adapt one or more elements of DFE 222, VGA 304, CTLE 302 and TXFIR 202. However, in the nonlinear region of operation of AFE 206, the error signal e(n) is not typically conducive for adaptation of elements in AFE 206 because of signal compression encountered in the nonlinear region. Thus, in the nonlinear region of operation of AFE 206, embodiments of the present invention might employ a conditional adaptation algorithm that discards the error signal e(n) and sets the gradients of the various adaptation loops to zero (except for the adaptation loop fork)) when AFE 206 is operating in the nonlinear region.

Embodiments of the invention might further condition the nonlinear operating region based on a stream of one or more of the detected data bits v(n) output from data slicer 212. Certain data patterns, such as low frequency patterns with many consecutive ones or zeroes tend to yield large signal amplitudes through AFE 206, and are thus more prone to analog nonlinearities than relatively higher frequency patterns and patterns without many consecutive ones or zeroes (e.g., Manchester encoded patterns). Higher frequency patterns tend to be subject to greater attenuation by channel 204, and typically do not yield as large a signal amplitude through AFE 206.

A first embodiment of the invention might employ a 3-bit data window composed of detected data bits v(n−2), v(n−1) and v(n) correlated with the sign of the error signal, e(n). As shown in Table 2, for embodiments of the invention, on the average only 50% of the e(n) terms are used in the adaptation of AFE 206 and DFE 222.

TABLE 2

| v(n − 2) | v(n − 1) | v(n) | sgn[e(n)] | Region of Operation | Employ e(n) in Adaptation? |
|---|---|---|---|---|---|
| 1 | 1 | 1 | 1 | Nonlinear | No |
| 1 | 1 | −1 | 1 | Linear | Yes |
| 1 | −1 | 1 | 1 | Nonlinear | No |
| 1 | −1 | −1 | 1 | Linear | Yes |
| −1 | 1 | 1 | 1 | Nonlinear | No |
| −1 | 1 | −1 | 1 | Linear | Yes |
| −1 | −1 | 1 | 1 | Nonlinear | No |
| −1 | −1 | −1 | 1 | Linear | Yes |
| 1 | 1 | 1 | −1 | Linear | Yes |
| 1 | 1 | −1 | −1 | Nonlinear | No |
| 1 | −1 | 1 | −1 | Linear | Yes |
| 1 | −1 | −1 | −1 | Nonlinear | No |
| −1 | 1 | 1 | −1 | Linear | Yes |
| −1 | 1 | −1 | −1 | Nonlinear | No |
| −1 | −1 | 1 | −1 | Linear | Yes |
| −1 | −1 | −1 | −1 | Nonlinear | No |

A second embodiment of the invention might also employ a 3-bit data window composed of detected data bits v(n−2), v(n−1) and v(n) correlated with the sign of the error signal, e(n). However, the second embodiment might also retain some of the e(n) terms for use in adaptation even though AFE 206 is operating in the nonlinear region. For example, if there is a transition between the current bit v(n) and the prior bit v(n−1), the corresponding e(n) term might be retained for use in the adaptation of AFE 206 and DFE 222, which is referred to herein as a pseudo-linear operating region of AFE 206. As shown in Table 3, for embodiments of the invention that retain the e(n) term if there is a transition between the current bit v(n) and the prior bit v(n−1), 50% of the e(n) terms are linear terms, 25% are pseudo-linear terms and 25% are non-linear terms that are discarded. Thus, as shown in Table 3, for embodiments of the invention, on the average 75% of the e(n) terms are used in the adaptation of AFE 206 and DFE 222.

TABLE 3

| v(n − 2) | v(n − 1) | v(n) | sgn[e(n)] | Region of Operation | Employ e(n) in Adaptation? |
|---|---|---|---|---|---|
| 1 | 1 | 1 | 1 | Nonlinear | No |
| 1 | 1 | −1 | 1 | Linear | Yes |
| 1 | −1 | 1 | 1 | Pseudo-linear | Yes |
| 1 | −1 | −1 | 1 | Linear | Yes |
| −1 | 1 | 1 | 1 | Nonlinear | No |
| −1 | 1 | −1 | 1 | Linear | Yes |
| −1 | −1 | 1 | 1 | Pseudo-linear | Yes |
| −1 | −1 | −1 | 1 | Linear | Yes |
| 1 | 1 | 1 | −1 | Linear | Yes |
| 1 | 1 | −1 | −1 | Pseudo-linear | Yes |
| 1 | −1 | 1 | −1 | Linear | Yes |
| 1 | −1 | −1 | −1 | Nonlinear | No |
| −1 | 1 | 1 | −1 | Linear | Yes |
| −1 | 1 | −1 | −1 | Pseudo-linear | Yes |
| −1 | −1 | 1 | −1 | Linear | Yes |
| −1 | −1 | −1 | −1 | Nonlinear | No |

A third embodiment of the invention might also employ a 3-bit data window composed of detected data bits v(n−2), v(n−1) and v(n) correlated with the sign of the error signal, e(n). In the third embodiment, the corresponding e(n) term might be discarded and not used in the adaptation of AFE 206 and DFE 222 if all three values are 1's or −1's. In the third embodiment, as shown in Table 4, 50% of e(n) terms are linear terms, 37.5% are pseudo-linear terms and 12.5% are non-linear terms that are discarded for adaptation. Thus, as shown in Table 4, 87.5% of the e(n) terms are retained for adaptation.

TABLE 4

| v(n − 2) | v(n − 1) | v(n) | sgn[e(n)] | Region of Operation | Employ e(n) in Adaptation? |
|---|---|---|---|---|---|
| 1 | 1 | 1 | 1 | Nonlinear | No |
| 1 | 1 | −1 | 1 | Linear | Yes |
| 1 | −1 | 1 | 1 | Pseudo-linear | Yes |
| 1 | −1 | −1 | 1 | Linear | Yes |
| −1 | 1 | 1 | 1 | Pseudo-linear | Yes |
| −1 | 1 | −1 | 1 | Linear | Yes |
| −1 | −1 | 1 | 1 | Pseudo-linear | Yes |
| −1 | −1 | −1 | 1 | Linear | Yes |
| 1 | 1 | 1 | −1 | Linear | Yes |
| 1 | 1 | −1 | −1 | Pseudo-linear | Yes |
| 1 | −1 | 1 | −1 | Linear | Yes |
| 1 | −1 | −1 | −1 | Pseudo-linear | Yes |
| −1 | 1 | 1 | −1 | Linear | Yes |
| −1 | 1 | −1 | −1 | Pseudo-linear | Yes |
| −1 | −1 | 1 | −1 | Linear | Yes |
| −1 | −1 | −1 | −1 | Nonlinear | No |

A fourth embodiment of the invention might also employ a 3-bit data window composed of detected data bits v(n−2), v(n−1) and v(n) correlated with the sign of the error signal, e(n). The fourth embodiment might also retain some of the e(n) terms for use in adaptation even though AFE 206 is operating in the nonlinear region. For example, depending on whether channel 204 is a high loss or a low loss channel, and depending on the nature of the DFE feedback values, in some instances it might be beneficial to retain low frequency patterns and remove high frequency patterns in reducing the amplitude of the received signal at the DFE sampling location. As shown in Table 5, embodiments of the invention keep the e(n) term if there is not a transition between v(n−1) and v(n).

TABLE 5

| v(n − 2) | v(n − 1) | v(n) | sgn[e(n)] | Region of Operation | Employ e(n) in Adaptation? |
|---|---|---|---|---|---|
| 1 | 1 | 1 | 1 | Pseudo-linear | Yes |
| 1 | 1 | −1 | 1 | Linear | Yes |
| 1 | −1 | 1 | 1 | Nonlinear | No |
| 1 | −1 | −1 | 1 | Linear | Yes |
| −1 | 1 | 1 | 1 | Pseudo-linear | Yes |
| −1 | 1 | −1 | 1 | Linear | Yes |
| −1 | −1 | 1 | 1 | Nonlinear | No |
| −1 | −1 | −1 | 1 | Linear | Yes |
| 1 | 1 | 1 | −1 | Linear | Yes |
| 1 | 1 | −1 | −1 | Nonlinear | No |
| 1 | −1 | 1 | −1 | Linear | Yes |
| 1 | −1 | −1 | −1 | Pseudo-linear | Yes |
| −1 | 1 | 1 | −1 | Linear | Yes |
| −1 | 1 | −1 | −1 | Nonlinear | No |
| −1 | −1 | 1 | −1 | Linear | Yes |
| −1 | −1 | −1 | −1 | Pseudo-linear | Yes |

Figure 5:
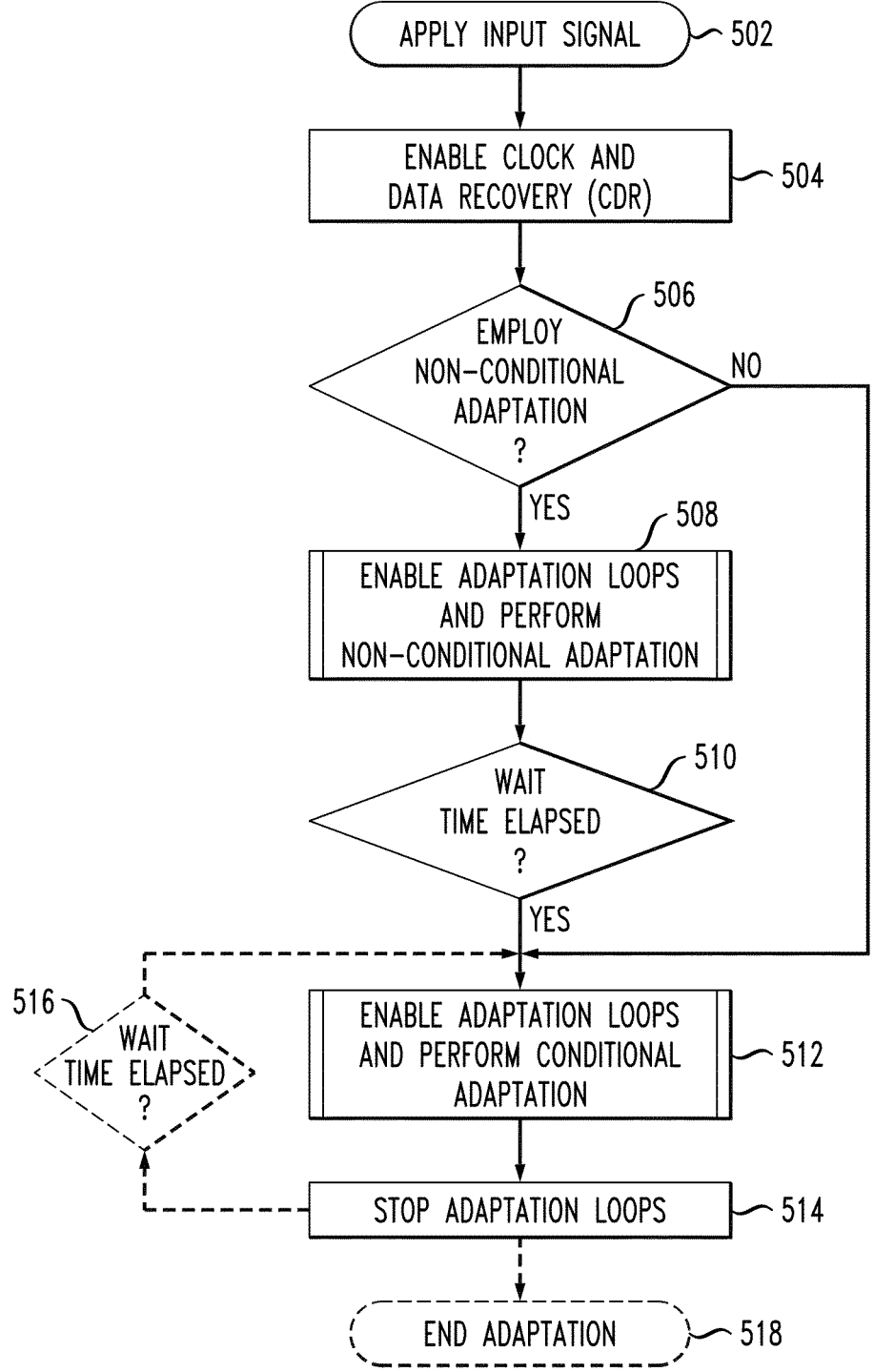
FIG. 5 shows an exemplary flow diagram of an adaptation algorithm employed to adapt one or more parameters of the AFE of FIG. 3.

FIG. 5 shows an exemplary flow diagram of adaptation algorithm 500 of the SERDES system shown in FIG. 2. At step 502, adaptation algorithm 500 is started when an input signal from transmitter 200 is applied to receiver 201. In some embodiments, the input signal might be a training signal, while in other embodiments the input signal might be a signal carrying data. This amplitude is chosen to be low enough that the VGA and CTLE circuitry in the AFE 206 does not exhibit any significant amount of non-linear distortion but is high enough for the receiver 201 to properly adapt to the attenuated input signal. In one embodiment, the transmit filter, TXFIR 202 might have an adjustable gain to control the amplitude of signals applied to channel 204.

At step 504, clock and data recovery is enabled, for example by CDR 214, to recover data and clock signals from the received signal. At step 506, receiver 201 determines whether to employ non-conditional adaptation. If, at step 506, non-conditional adaptation is employed, at step 508 one or more adaptation loops of receiver 201 are enabled to perform the non-conditional adaptation, for example by DFE 222 and at least one of adaptation modules 230, 231 and 232. At step 508, the non-conditional adaptation might include conventional sign-sign LMS adaptation of DFE, AFE, TX-FIR, etc without any conditioning of the gradient. At step 510, an optional predefined time elapses before proceeding to step 512 to enable conditional adaptation, for example by DFE 222 and at least one of adaptation modules 230, 231 and 232. The conditional adaptation algorithm of step 512 will be described in greater detail in regard to FIG. 6. At step 512, one or more samples are taken of the signal received, r(t), by receiver 201, and optionally in some embodiments, a conditional adaptation algorithm is performed. As described herein, the one or more samples are employed to generate an error signal e(n). At step 514, the adaptation loops are optionally stopped, for example once all the adaptation loops converge (e.g., the filter coefficients, the weighting factor, gain, etc. reach a steady-state or no longer significantly change). However, in some embodiments, the adaptation loops might operate continuously without stopping at step 514, for example as indicated by optional steps 516 and 518. The convergence of the adaptation loops might depend on factors such as the pulse response of channel 204, the bandwidths of the adaptation loops, the algorithm used for adaptation, the data pattern of the input signal, and other factors. At step 518, adaptation algorithm 500 optionally ends, while at step 516, adaptation algorithm 500 waits for a predefined time to elapse before re-enabling the adaptation loops for conditional adaptation at step 512.

Figure 6:
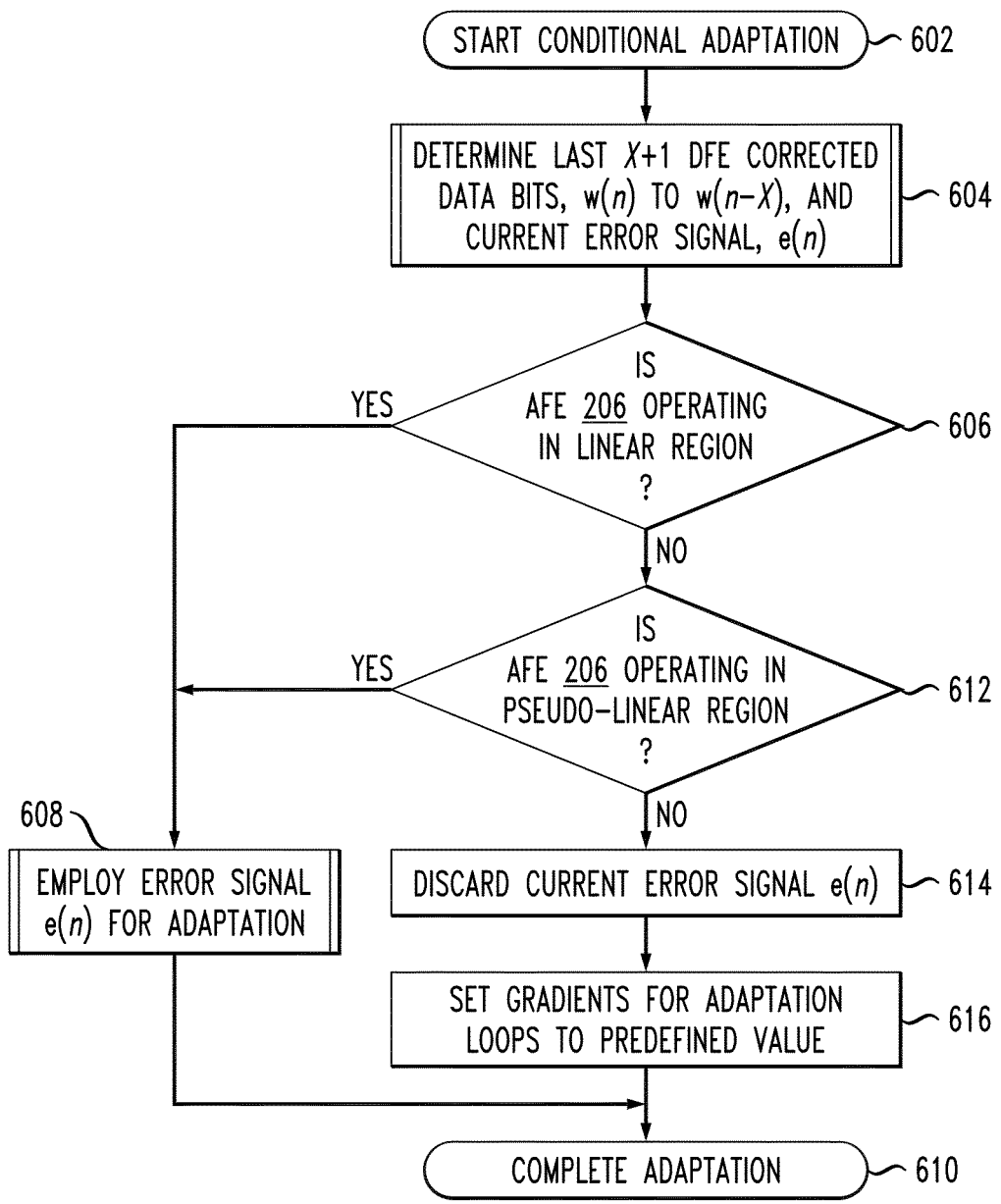
FIG. 6 shows an exemplary flow diagram of a conditional adaptation algorithm sub-process of the adaptation algorithm of FIG. 5.

FIG. 6 shows an exemplary flow diagram of the conditional adaptation algorithm performed at step 506. At step 602, conditional adaptation algorithm of step 506 is started. At step 604, a window of X+1 DFE corrected data bits, w(n) to w(n−X), and the current error signal e(n), are determined. In exemplary embodiments of the invention, a window of 3 DFE corrected data bits might be employed, such that X is equal to 2.

Embodiments of the invention might further employ "fine conditioning" at step 604 to achieve improved converged values for the various adaptive loops of receiver 201 (e.g., DFE adaptation module 231, CTLE adaptation module 232 and VGA/$h_0$ adaptation module 230). Such fine conditioning might employ additional error data in the window (e.g., e(n) to e(n−X)). Thus, more error data is employed for adaptation. In such cases, the additional error data might correspond to signal values having less nonlinear compression, thus allowing for improved convergence of the adaptation loops. Additionally, since more error data is employed, the convergence time of the adaptation algorithm might be relatively faster than without employing the additional error data. Lastly, when additional error data is employed, the adaptation algorithm will generally be less sensitive to data pattern dependencies.

Embodiments of the invention might perform step 604 employing both prior data (e.g., v(n−1), etc.), and also employ "future" data. Future data might causally be included in the adaptation algorithm by increasing the latency in the adaptation error path by yT, where y is a delay factor and T is the sample period. For example, increasing the latency of the error path by 1T might allow the adaptation algorithm to employ future data bit v(n+1), increasing the latency of the error path by 2T might allow the adaptation algorithm to employ future data bit v(n+2), and so on. At time n+M, adaptation algorithm 506 might employ "current" samples v(n) and e(n), but also might employ one or more past samples v(n−X) and e(n−X), as well as "future" samples v(n+M). Thus, at time n+1, the set of information from v(n+1), v(n), past v(n−X) decisions and e(n) might be employed to determine whether e(n) should be retained for adaptation. Employing "future" bits such as v(n+1) might relatively improve amplitude distributions of the DFE corrected signal w(n) to have a smaller maximum amplitude.

At step 606, the algorithm determines whether AFE 206 is operating in the linear region, such as described in regard to FIG. 4. In embodiments of the invention, and as shown above in exemplary Tables 2-5, AFE operation in the linear region is determined based on the sign of error signal e(n), and the value of the detected data output by data slicer 212, such that in the linear region, sgn[e(n)]*v(n)=−1. If, at step 606, AFE 206 is operating in the linear region, conditional adaptation algorithm 506 continues to step 608. At step 608, the current value of the error signal, e(n), is employed to adjust one or more adaptation loops of receiver 201 (e.g., DFE adaptation module 231, CTLE adaptation module 232 and VGA/$h_0$ adaptation module 230). In some embodiments, adaptation at step 608 might occur as described in related U.S. patent application Ser. No. 13/244,985. At step 610, conditional adaptation algorithm 610 completes.

If, at step 606, AFE 206 is not operating in the linear region, conditional adaptation algorithm 506 continues to step 612. At step 612, the algorithm determines whether AFE 206 is operating in a "pseudo-linear" region of operation. As described herein, in some embodiments, the pseudo-linear region might be defined as a condition when there is a transition between the current bit v(n) and the prior bit v(n−1). In some other embodiments, the pseudo-linear region might be defined as a condition when there is not a transition between v(n) and v(n−1). In yet some other embodiments, the pseudo-linear region might be defined as a condition when there is not a transition between the current bit v(n) and the prior two bits v(n−1) and v(n−2) (e.g., all bits in the window are the same value). Other embodiments might employ one or more of the definitions of the pseudo-linear region described herein in combination. If, at step 612, AFE 206 is operating in the defined pseudo-linear region, then at step 608, the current value of the error signal, e(n), is employed to adjust one or more adaptation loops of receiver 201 (e.g., DFE adaptation module 231, CTLE adaptation module 232 and VGA/$h_0$ adaptation module 230).

If, at step 612, AFE 206 is not operating in the defined pseudo-linear region, then at step 614, AFE 206 is operating in the nonlinear region. As described herein, operation in the non-linear region might typically be when one or more of the defined pseudo-region conditions are not met, and sgn[e(n)]*v(n)=1. At step 614, the current value of the error signal, e(n), is discarded. At step 616, the gradients for one or more of the adaptation loops of receiver 201 might be set to a predetermined value. In embodiments of the invention, the gradient of the h0 adaptation loop (e.g., VGA/$h_0$ adaptation module 230) is not set to a predetermined value, but is adapted. In some embodiments, the gradients of the adaptation loops are set to zero. At step 610, conditional adaptation algorithm 610 completes.

Figure 7:
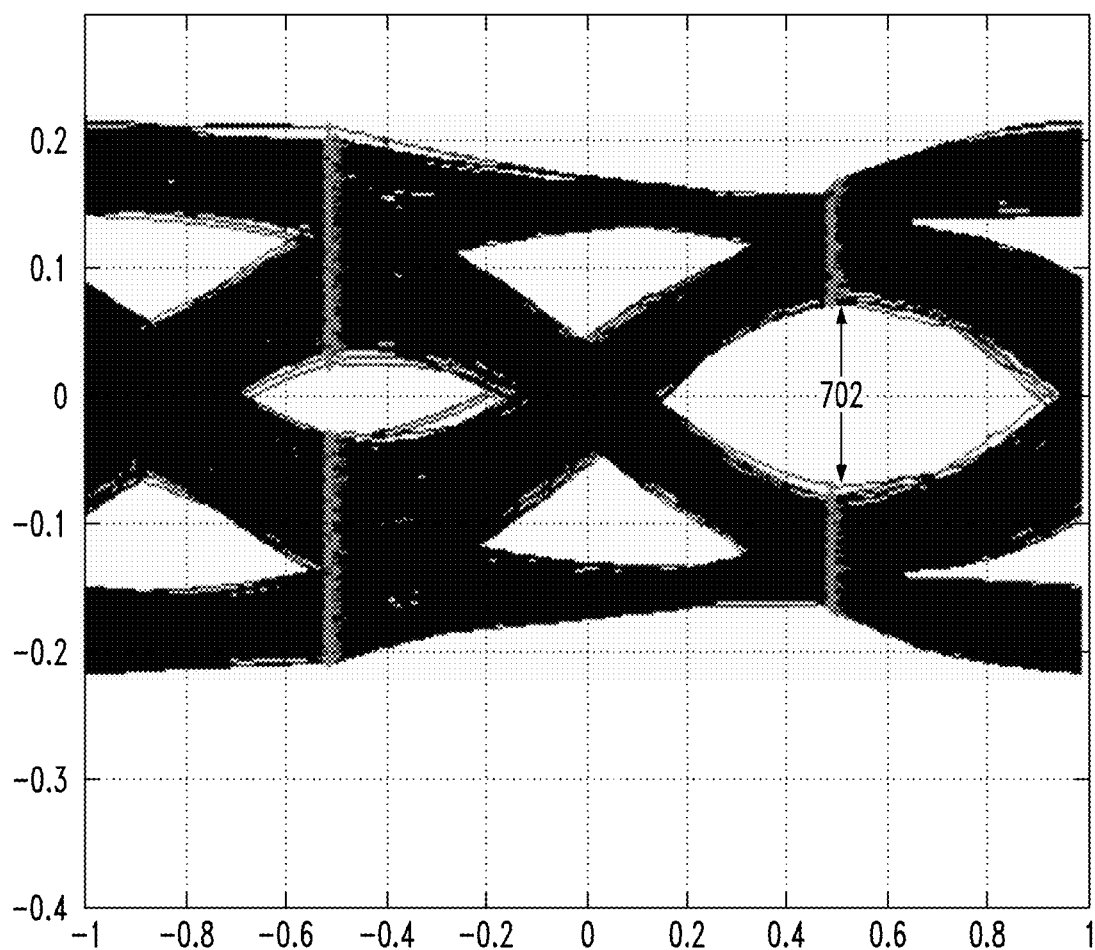
FIG. 7 shows an exemplary eye diagram of the AFE of FIG. 2.
Figure 8:
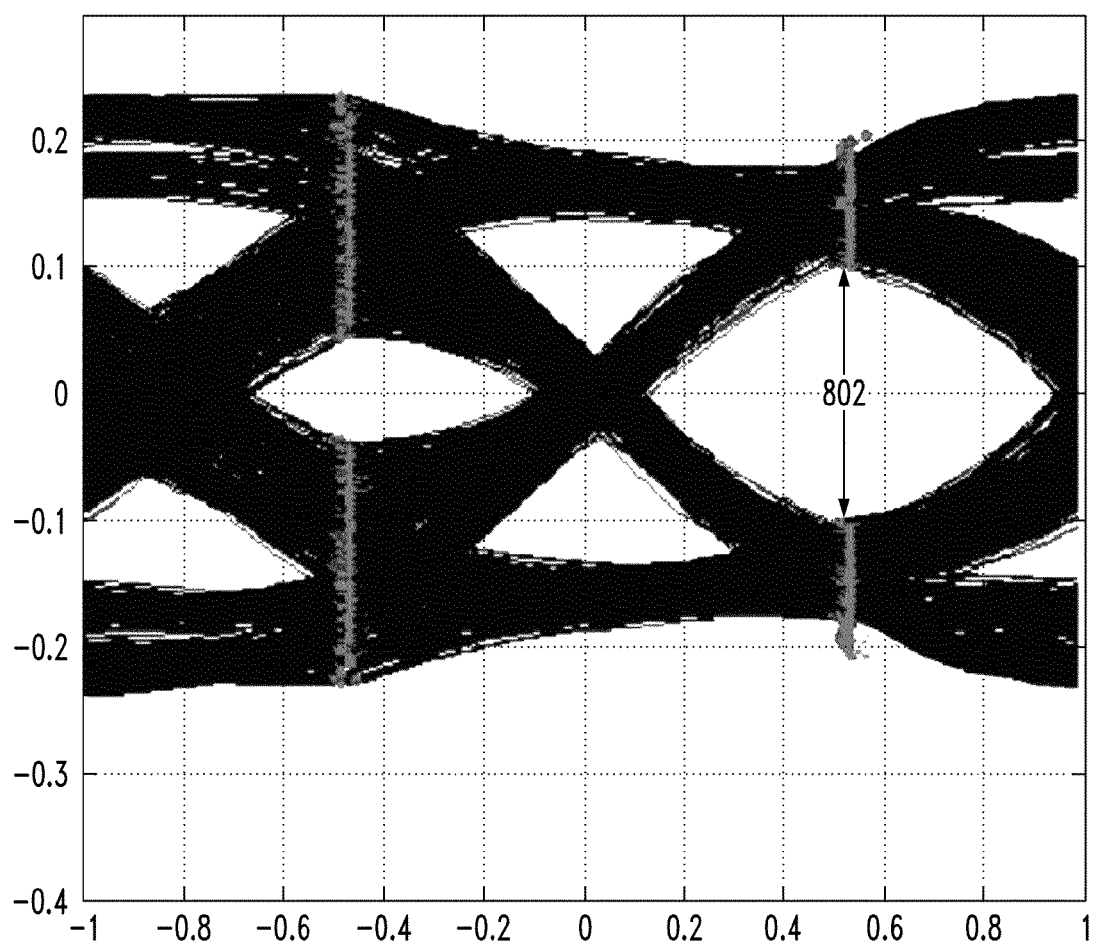
FIG. 8 shows an exemplary eye diagram of the AFE of FIG. 2 operating in accordance with the conditional adaptation algorithm of FIG. 6.

Embodiments of the invention employing a conditional adaptation algorithm as described herein show performance improvement over traditional adaptation algorithms in terms of vertical margins and horizontal margins of the inner eye opening. FIG. 7 shows the inner eye opening achieved with adaptation of DFE 222 and AFE 206 without employing the conditional adaptation algorithm as described herein. FIG. 8 shows an improved inner eye opening is achieved with adaptation of DFE 222 and AFE 206 in accordance with the conditional adaptation algorithm of FIG. 6. The data eye diagram of FIG. 7 might be generated by a non-conditional adaptation algorithm, while the data eye diagram of FIG. 8 might be generated by a conditional adaptation algorithm such as described herein. As shown in FIGS. 7 and 8, the inner eye opening has increased from approximately 160 mVdpp in FIG. 7 (shown as eye opening 702) to approximately 190 mVdpp in FIG. 8 (shown as eye opening 802), constituting an increase in vertical margin of approximately 30 mVdpp for embodiments employing a conditional adaptation algorithm.

As described herein, embodiments of the invention provide conditional adaptation of linear filters such as DFE 222, CTLE 302, TXFIR 202, or a feed forward equalizer (FFE). The conditional adaptation is based on at least one of: (1) the data relationship between a current data decision of the DFE and a current error signal, (2) a data relationship between the current data decision of the DFE and past data decisions of the DFE, and (3) a data relationship between the current data decision of the DFE and "future" data decisions of the DFE.

While the exemplary embodiments of the invention have been described with respect to processes of circuits, including possible implementation as a single integrated circuit, a multi-chip module, a single card, or a multi-card circuit pack, the invention is not so limited.

As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing some embodiments of the invention. When implemented on a general-purpose processor, the program code segments combine with the processor to provide a unique device that operates analogously to specific logic circuits. The invention can also be embodied in the form of a bitstream or other sequence of signal values electrically or optically transmitted through a medium, stored magnetic-field variations in a magnetic recording medium, etc., generated using a method and/or an apparatus of the invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of embodiments of this invention might be made by those skilled in the art without departing from the scope of the invention as expressed in the following claims.

We claim:

1. A method of adjusting configurable parameters of at least one filter of a communication system, the method comprising:
    conditioning, by an analog front end (AFE) of a receiver in the communication system, an input signal applied to the receiver;
    generating, by a sampler of the receiver, one or more sampled values of the conditioned input signal;
    digitizing, by a data detector of the receiver, the one or more sampled values of the input signal;
    generating, by at least one error detection module of the receiver, an error signal based on one or more of a plurality of digitized values of the input signal and at least one target value;
    generating, by a decision feedback equalizer (DFE) of the receiver, an adjustment signal based on one or more of a plurality of digitized values of the input signal and one or more of a plurality of values of the error signal;
    subtracting, by a summer of the receiver, the adjustment signal from the conditioned input signal, generating an adjusted input signal;
    determining, by at least one adaptation module of the receiver, a conditional adaptation signal based on a comparison of one or more of a plurality of sampled values of the adjusted input signal and one or more of a plurality of values of the error signal; and
    adjusting, by the at least one adaptation module, a transfer function of the at least one filter based on the determined conditional adaptation signal;
    wherein the step of determining, by at least one adaptation module of the receiver, a conditional adaptation signal based on a comparison of one or more of a plurality of sampled values of the adjusted input signal and one or more of a plurality of values of the error signal further comprises:
    selecting a window of N bits of the adjusted input signal, wherein N is a positive integer;
    selecting a window of M bits of the error signal, wherein M is a positive integer;
    determining an operating region of each of the at least one filters based on at least one of (i) the selected window of N bits of the adjusted input signal and (ii) the selected window of M bits of the error signal; and
    generating the conditional adaptation signal based on the determined operating region of each of the at least one filters and at least one of (i) the N bits of the adjusted input signal and (ii) the M bits of the error signal.

2. The method of claim 1, wherein the at least one filter comprises the AFE, the DFE and a transmit finite impulse response filter (TXFIR) of a transmitter of the communication system.

3. The method of claim 1, wherein the step of determining an operating region of each of the at least one filters comprises:
    determining a value of the error signal multiplied by the digitized data, wherein if the value is a first predefined value, the filter is in a linear operating region, and wherein if the value is a second predefined value, the filter is in a nonlinear operating region; and
    if the filter is in a nonlinear operating region:
        determining whether the filter is operating in a pseudo-linear operating region;
        if the filter is operating in a pseudo-linear operating region:
            employing the error signal to determine the conditional adaptation signal.

4. The method of claim 3, wherein the filter is operating in a pseudo-linear operating region based on the presence of at least one of a first condition, a second condition and a third condition, wherein:
    the first condition comprises presence of a transition in value between a first data bit and a subsequent data bit of the N bit window of the adjusted input signal;
    the second condition comprises presence of substantially equivalent-values for substantially all the data bits of the N bit window of the adjusted input signal; and
    the third condition comprises absence of a transition in value between a first data bit and a subsequent data bit of the N bit window of the adjusted input signal.

5. The method of claim 1, wherein N is equal to 3 and M is equal to 3.

6. The method of claim 1, wherein M is equal to 1.

7. The method of claim 1 further comprising:
    delaying a data path of the error signal by yT, where T is a sampling period of the sampler, and y is a delay factor;
    employing one or more future data bits in the N bit window, wherein the number of future data bits included in the N bit window is equal to y.

8. The method of claim 1, wherein, for the method, the AFE comprises at least one of a continuous time linear equalizer (CTLE) and variable gain amplifier (VGA), and wherein the configurable parameters comprise a gain parameter of the CTLE, and a gain parameter of the VGA.

9. The method of claim 1, further comprising:
    communicating, by the adaptation module, to a finite impulse response (FIR) equalizer in the transmitter via a backchannel; and
    adjusting one or more configurable parameters of the FIR equalizer based on the determined conditional adaptation signal, wherein the configurable parameters comprise a tap weight of the FIR equalizer.

10. The method of claim 1, comprising adjusting, by the at least one adaptation module, a transfer function of the at least one filter based on the determined conditional adaptation signal, thereby improving an operating margin of an eye diagram of the communication system.

11. A non-transitory machine-readable medium, having encoded thereon program code, wherein, when the program code is executed by a machine, the machine implements a method of adjusting configurable parameters of an analog front end (AFE) of a receiver in a communication system, the method comprising:

conditioning, by an analog front end (AFE) of a receiver in the communication system, an input signal applied to the receiver;

generating, by a sampler of the receiver, one or more sampled values of the conditioned input signal;

digitizing, by a data detector of the receiver, the one or more sampled values of the input signal;

generating, by at least one error detection module of the receiver, an error signal based on one or more of a plurality of digitized values of the input signal and at least one target value;

generating, by a decision feedback equalizer (DFE) of the receiver, an adjustment signal based on one or more of a plurality of digitized values of the input signal and one or more of a plurality of values of the error signal;

subtracting, by a summer of the receiver, the adjustment signal from the conditioned input signal, generating an adjusted input signal;

determining, by at least one adaptation module of the receiver, a conditional adaptation signal based on a comparison of one or more of a plurality of sampled values of the adjusted input signal and one or more of a plurality of values of the error signal; and adjusting, by the at least one adaptation module, a transfer function of the at least one filter based on the determined conditional adaptation signal;

wherein the step of determining, by at least one adaptation module of the receiver, a conditional adaptation signal based on a comparison of one or more of a plurality of sampled values of the adjusted input signal and one or more of a plurality of values of the error signal further comprises:

selecting a window of N bits of the adjusted input signal, wherein N is a positive integer;

selecting a window of M bits of the error signal, wherein M is a positive integer;

determining an operating region of each of the at least one filters based on at least one of (i) the selected window of N bits of the adjusted input signal and (ii) the selected window of M bits of the error signal; and generating the conditional adaptation signal based on the determined operating region of each of the at least one filters and at least one of (i) the N bits of the adjusted input signal and (ii) the M bits of the error signal.

12. The non-transitory machine-readable medium of claim 11, wherein the at least one filter comprises the AFE, the DFE and a transmit finite impulse response filter (TXFIR) of a transmitter of the communication system.

13. The non-transitory machine-readable medium of claim 11, wherein the step of determining an operating region of each of the at least one filters comprises:

determining a value of the error signal multiplied by the digitized data, wherein if the value is a first predefined value, the filter is in a linear operating region, and wherein if the value is a second predefined value, the filter is in a nonlinear operating region; and if the filter is in a nonlinear operating region:
determining whether the filter is operating in a pseudo-linear operating region;
if the filter is operating in a pseudo-linear operating region;
employing the error signal to determine the conditional adaptation signal,
wherein the filter is operating in a pseudo-linear operating region based on the presence of at least one of a first condition, a second condition and a third condition, wherein:

the first condition comprises presence of a transition in value between a first data bit and a subsequent data bit of the N bit window of the adjusted input signal;

the second condition comprises presence of substantially equivalent-values for substantially all the data bits of the N bit window of the adjusted input signal; and the third condition comprises absence of a transition in value between a first data bit and a subsequent data bit of the N bit window of the adjusted input signal.

14. The non-transitory machine-readable medium of claim 13, wherein N is equal to 3 and M is equal to 3.

15. The non-transitory machine-readable medium of claim 11 further comprising:

delaying a data path of the error signal by yT, where T is a sampling period of the sampler, and y is a delay factor;

employing one or more future data bits in the N bit window, wherein the number of future data bits included in the N bit window is equal to y.

16. The non-transitory machine-readable medium of claim 11, further comprising:

communicating, by the adaptation module, to a finite impulse response (FIR) equalizer in the transmitter via a backchannel; and adjusting one or more configurable parameters of the FIR equalizer based on the determined conditional adaptation signal, wherein the configurable parameters comprise a tap weight of the FIR equalizer.

17. A communication system comprising:

a transmitting device configured to transmit an input signal over a channel to a receiver of the communication system;

an analog front end (AFE) of the receiver configured to condition the input signal;

a sampler of the receiver configured to generate one or more sampled values of the input signal;

a data detector of the receiver configured to digitize the one or more sampled values of the input signal;

at least one subtractor of the receiver configured to generate an error signal based on one or more of a plurality of digitized values of the input signal and at least one target value;

a decision feedback equalizer (DFE) of the receiver configured to generate an adjustment signal based on one or more of a plurality of digitized values of the input signal and one or more of a plurality of values of the error signal;

a summer of the receiver configured to subtract the adjustment signal from the conditioned input signal and generate an adjusted input signal; and at least one adaptation module of the receiver configured to (i) generate a conditional adaptation signal based on a comparison of one or more of a plurality of sampled values of the adjusted input signal and one or more of a plurality of values of the error signal, and (ii) adjust a transfer function of at least one filter based on the determined conditional adaptation signal, thereby improving an operating margin of an eye diagram of the communication system, wherein the at least one filter comprises the AFE, the DFE and a transmit finite impulse response filter (TXFIR) of the transmitter;

wherein the at least one adaptation module of the receiver is further configured to:

select a window of N bits of the adjusted input signal, wherein N is a positive integer;

select a window of M bits of the error signal, wherein M is a positive integer;

determine an operating region of the AFE for the selected window of N bits of the adjusted input signal; and generate the conditional adaptation signal based on the determined operating region of the AFE and at least one of (i) the N bits of the adjusted input signal and (ii) the M bits of the error signal.

18. The communication system of claim 17, wherein the at least one adaptation module is further configured to:

determine a value of the error signal multiplied by the digitized data, wherein if the value is positive, the AFE is in a linear operating region, and wherein if the value is negative, the AFE is in a nonlinear operating region; and if the AFE is in a nonlinear operating region:
   determine whether the AFE is operating in a pseudo-linear operating region;
   if the AFE is operating in a pseudo-linear operating region:
      employ the error signal to determine the conditional adaptation signal, wherein the AFE is operating in a pseudo-linear operating region based on the presence of at least one of a first condition, a second condition and a third condition, wherein:

the first condition comprises presence of a transition in value between a first data bit and a subsequent data bit of the N bit window of the adjusted input signal;

the second condition comprises presence of substantially equivalent-values for substantially all the data bits of the N bit window of the adjusted input signal; and the third condition comprises absence of a transition in value between a first data bit and a subsequent data bit of the N bit window of the adjusted input signal.

19. The communication system claim 17 further comprising:

at least one delay module configured to delay a data path of the error signal by yT, where T is a sampling period of the sampler, and y is a delay factor, whereby the at least one adaptation module is configured to employ one or more future data bits in the N bit window, wherein the number of future data bits included in the N bit window is equal to y.

20. The communication system of claim 17, wherein
the transmitter is implemented as a first integrated circuit chip; and
the receiver is implemented as a second integrated circuit chip.

21. A transmitter for encoding data for transmission over a communication channel, the transmitter comprising:

a finite impulse response (FIR) filter, the FIR filter coupled to the communication channel, wherein the FIR filter is configured to (i) equalize data for transmission over the communication channel, and (ii) adjust one or more configurable parameters of the FIR filter based on a conditional adaptation signal;

wherein the FIR filter is further configured to:
receive the conditional adaptation signal from a receiver coupled to the communication channel, wherein the receiver is configured to decode the transmitted data, and wherein the conditional adaptation signal is based on a determined operating region of the AFE and at least one of (i) a selected window of N bits of an adjusted input signal and (ii) a selected window of M bits of an error signal, wherein:

the adjusted input signal is based on one or more digitized samples of the decoded data and one or more of a plurality of values of an error signal; and the error signal is based on one or more digitized samples of the decoded data and at least one target value.

22. The transmitter of claim 21, wherein the transmitter is coupled to a backchannel configured to communicate the conditional adaptation signal from the receiver.

23. The transmitter of claim 21, wherein the one or more configurable parameters comprise a tap weight of the FIR equalizer.

24. A receiver for decoding received data from a communication channel, the receiver comprising:

an analog front end (AFE) of the receiver configured to condition an input signal;

a sampler of the receiver configured to generate one or more sampled values of the input signal;

a data detector of the receiver configured to digitize the one or more sampled values of the input signal;

at least one subtractor of the receiver, an error signal based on one or more of a plurality of digitized values of the input signal and at least one target value;

a decision feedback equalizer (DFE) of the receiver configured to generate an adjustment signal based on one or more of a plurality of digitized values of the input signal and one or more of a plurality of values of the error signal;

a summer of the receiver configured to subtract the adjustment signal from the conditioned input signal and generate an adjusted input signal; and at least one adaptation module of the receiver configured to (i) generate a conditional adaptation signal based on a comparison of one or more of a plurality of sampled values of the adjusted input signal and one or more of a plurality of values of the error signal, and (ii) adjust a transfer function of at least one filter based on the determined conditional adaptation signal, thereby improving an operating margin of an eye diagram of the receiver, wherein the at least one filter comprises the AFE, the DFE and a transmit finite impulse response filter (TXFIR) of a transmitter of the communication system; and wherein the at least one adaptation module of the receiver is further configured to:

select a window of N bits of the adjusted input signal, wherein N is a positive integer;

select a window of M bits of the error signal, wherein M is a positive integer;

determine an operating region of the AFE for the selected window of N bits of the adjusted input signal; and generate the conditional adaptation signal based on the determined operating region of the AFE and at least one of (i) the N bits of the adjusted input signal and (ii) the M bits of the error signal.

25. The receiver of claim 24, wherein the adaptation module is further configured to communicate the conditional adaptation signal to a finite impulse response (FIR) equalizer in a transmitter, wherein the transmitter is configured to adjust one or more configurable parameters of the FIR equalizer based on the determined conditional adaptation signal.

26. The receiver of claim 25, wherein the configurable parameters comprise a tap weight of the FIR equalizer.

27. The receiver of claim 25, wherein the receiver is coupled to a backchannel configured to communicate the conditional adaptation signal to the transmitter.

\* \* \* \* \*